United States Patent [19]

Lawson et al.

[11] 4,314,984
[45] Feb. 9, 1982

[54] THERMOCHEMICAL GENERATION OF HYDROGEN

[76] Inventors: Robert A. Frosch, Administrator of the National Aeronautics and Space Administration, with respect to an invention of Daniel D. Lawson, Arcadia; Gene R. Petersen, Pasadena, both of Calif.

[21] Appl. No.: 145,207

[22] Filed: Apr. 30, 1980

[51] Int. Cl.³ .............................................. C01B 13/00
[52] U.S. Cl. ........................................ 423/579; 203/12; 422/186; 422/198; 422/235; 423/539; 423/540; 423/542; 423/648 R
[58] Field of Search ............... 423/539, 542, 532, 540, 423/579; 203/12

[56] References Cited

U.S. PATENT DOCUMENTS

| | | | |
|---|---|---|---|
| 520,994 | 6/1894 | Kessler | 203/12 |
| 1,323,847 | 12/1919 | Dryen | 203/12 |
| 2,032,457 | 3/1936 | Acken | 203/12 |
| 2,326,099 | 8/1943 | Kokatnur et al. | 203/12 |
| 3,642,583 | 2/1972 | Greenberg et al. | 423/DIG. 12 |
| 4,056,607 | 11/1977 | Behr | 423/579 |
| 4,117,102 | 9/1978 | Schulten et al. | 423/579 |
| 4,139,596 | 2/1979 | Vaseen | 423/522 |
| 4,177,249 | 12/1979 | Stoddard et al. | 423/522 |
| 4,178,357 | 12/1979 | Stoddard et al. | 423/522 |

OTHER PUBLICATIONS

Alien Property Custodian, Ser. No. 292,742 (Jul. 13, 1943).

*Primary Examiner*—O. R. Vertiz
*Assistant Examiner*—Wayne A. Langel
*Attorney, Agent, or Firm*—Paul F. McCaul; John R. Manning

[57] ABSTRACT

The direct fluid contact heat exchange with $H_2SO_4$ at about 330° C. prior to high temperature decomposition at about 830° C. in the oxygen release step of several thermochemical cycles for splitting water into hydrogen and oxygen provides higher heat transfer rates, savings in energy and permits use of cast vessels rather than expensive forged alloy indirect heat exchangers. Among several candidate perfluorocarbon liquids tested, only perfluoropropylene oxide polymers having a degree of polymerization from about 10 to 60 were chemically stable, had low miscibility and vapor pressure when tested with sulfuric acid at temperatures from 300° C. to 400° C.

8 Claims, 2 Drawing Figures

THERMOCHEMICAL GENERATION OF HYDROGEN

ORIGIN OF THE INVENTION

The invention described herein was made in the performance of work under a NASA contract and is subject to the provisions of Section 305 of the National Aeronautics and Space Act of 1958, public law 83-568 (72 Statute 435; 42 U.S.C. 2457).

TECHNICAL FIELD

The present invention relates to the thermochemical production of hydrogen and, more particularly, to the use of immiscible, direct contact heat exchange fluids for use in the oxygen release step of the cycle.

BACKGROUND ART

Hydrogen has been identified as a flexible fuel form that:

1. permits storage of energy over a wide range of time periods (from hours to years);
2. enables efficient energy transport over long distances within available distribution networks;
3. offers chemical and physical characteristics which propose several distinct applications:
    as a chemical feedstock,
    as a fuel for electrochemical fuel cell systems in decentralized power generating stations, and
    as a fuel supplement to natural gas.

Most of the hydrogen is currently produced through steam reforming of natural gas. Natural gas is a depleting, finite resource as are all of the other fossil fuel sources and is becoming increasingly expensive. New hydrogen production technologies are in the process of development such as coal gasification, water electrolysis or thermochemical water splitting. While coal gasification appears to be the most likely alternative for large scale production of hydrogen, the other technologies appear more competitive for supplying small scale uses (i.e. less than 1 million cubic feet a day).

Thermocemical processes are being explored since thermal energy available from thermonuclear reactors and/or from solar collectors can be fixed as hydrogen, a storable fuel. The decomposition of water by thermochemical means proceeds according to the reaction:

$$H_2O(L) = H_2(G) + \tfrac{1}{2}O_2(G) \qquad (1)$$

An analysis of the thermodynamics of the cycle requires that energy and entropy be supplied in the cycle. The main feature of this reaction is its highly endothermic nature requiring an input of 40,000 kj/kg-mol. Therefore, the reaction must be practiced as close as possible to ideal conditions in order to be practical. Raising the temperature of the reaction will increase the change in positive entropy and also increases the rate of change of the extent of reaction with temperature.

In a number of thermochemical cycles under active investigation, the oxygen release step is the thermal decomposition of sulfuric acid:

$$2H_2SO_4(G) \longrightarrow 2SO_2(G) + O_2(G) + 2H_2O(G) \qquad (2)$$
$$\sim 830° \text{ C.}$$

This reaction is highly endothermic and the temperature change required to reduce the Gibb's function to zero is estimated to be about 510 K. Since the temperature difference occurring between the boiling point of sulfuric acid (350° C.) and the temperature available from a high-temperature nuclear reactor (HTR) (~850° C.) is about 500° C. and the match of the changes in Gibb's function and entropy for the reaction (2), the reaction is often used as the oxygen release step in thermochemical cycles. The aqueous sulfuric acid must be concentrated and vaporized at 330° C. to 350° C. before the high temperature cracking or decomposition step at 830° C. Maximum corrosion occurs at the vaporization point where sulfuric acid liquid vaporizes to sulfuric acid vapor.

Conventional tubular heat exchangers are thermally inefficient and require the use of expensive forged alloy tubes. It has been suggested that a direct fluid contact heat exchange with $H_2SO_4$ would have energy saving benefits over conventional heat exchange in the vaporization of $H_2SO_4$ at 330° C. Direct contact heat exchange occurs when two immiscible fluids at different temperatures are mixed. When one of the two fluids undergoes a change of phase, extremely high heat transfer rates result.

Liquids used for heat exchange in direct contact with $H_2SO_4$ must meet the following criteria:

1. Liquids must be chemically stable to concentrated sulfuric acid in the temperature range of 300° to 400° C. for the required service periods.
2. Liquids must have very low miscibility with sulfuric acid at use temperatures.
3. Liquids must have low vapor pressure at use temperature to prevent loss by vaporization.

It is also desirable that they should be liquid at room temperature and not be high in cost.

Since the contact is being made with hot concentrated sulfuric acid, most organics are not suitable because of reactivity with the acid. Because of their inertness, fluorine substituted organic materials are the most logical candidates. Under very strong acidic conditions, aliphatic fluorocarbons should be stable because of the very high heats of formation of the carbon-fluorine bond.

DISCLOSURE OF INVENTION

However it was discovered that most commercial fluorocarbon fluids are not satisfactory for direct contact heat exchange with hot sulfuric acid. It was discovered that certain perfluoroalkylene oxide polymers can be utilized as direct heat exchange fluids with sulfuric acid. However, when several available materials were tested, chlorofluorocarbon polymers decomposed to a wax, perfluorocylic hydrocarbons, perfluorotributyl amines and low molecular weight polyperfluoropropylene oxide polymers vaporized in a short period. U.S. Pat. Nos. 4,139,596; 4,177,249 and 4,178,357 disclose use of inert fluorinated fluids in a process for the production of sulfuric acid. Exothermic heat of reaction is captured by indirect heat exchange. The use of direct heat exchange fluids will provide higher thermal efficiencies and will permit use of cast metal vessels for the oxygen splitting step of the cycle.

These and many other features and attendant advantages of the invention will become apparent as the invention becomes better understood by reference to the following detailed description when considered in conjunction with the acompanying drawings.

DETAILED DESCRIPTION OF THE INVENTION

Figure 1:
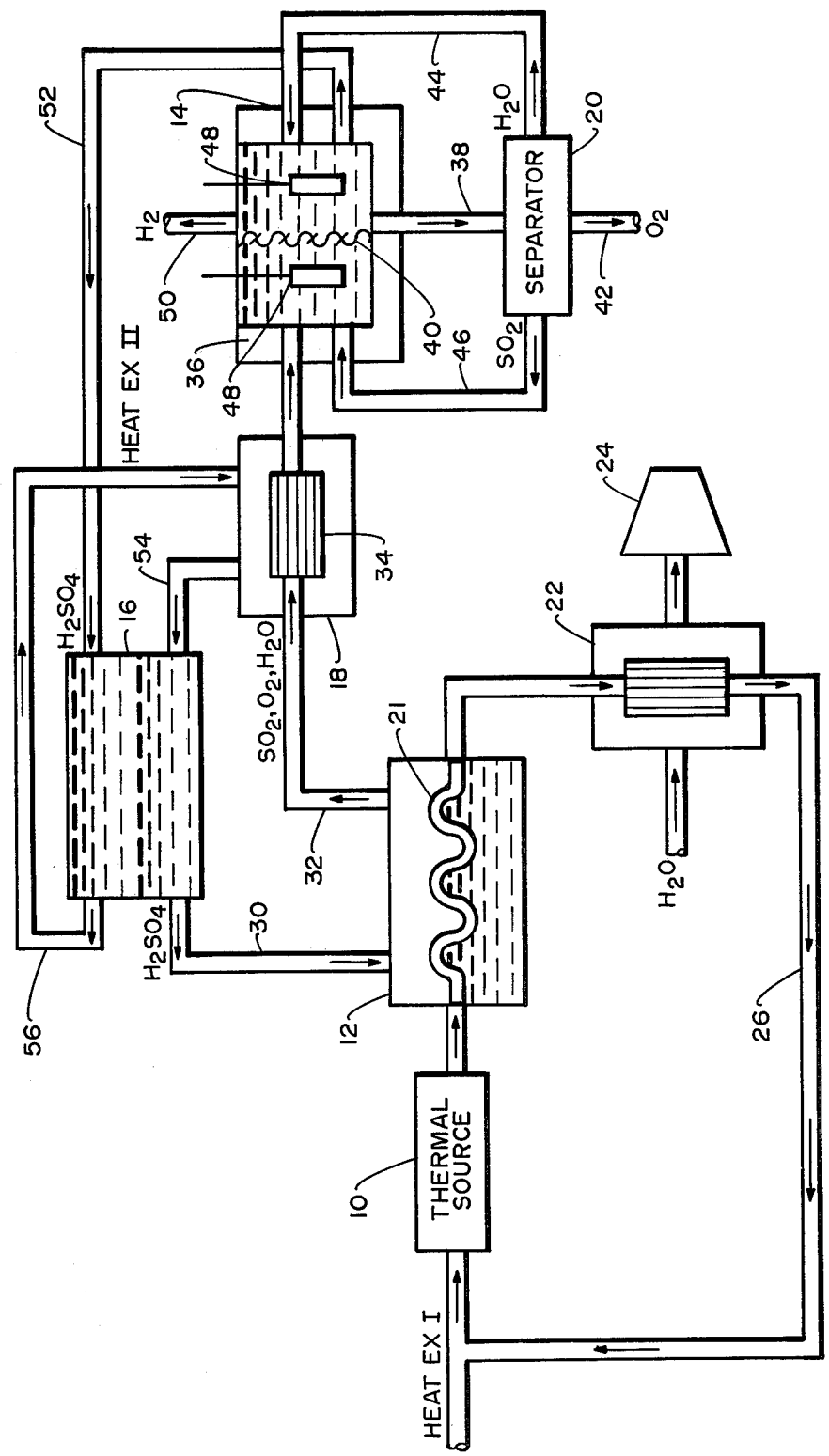
FIG. 1 is a schematic view of a thermochemical system.

The thermochemical cycle for producing hydrogen is based on a series of reactions of at least two and generally three reactions to split water into hydrogen and oxygen. The generalized three step reaction based on sulfuric acid is as follows:

$$2HX \rightarrow H_2 + X_2 \quad (3)$$

$$X_2 + SO_2 + 2H_2O \rightarrow H_2SO_4 + 2HX \quad (4)$$

$$H_2SO_4 \rightarrow H_2O + SO_2 + \tfrac{1}{2}O_2 \quad (5)$$

Examples of suitable cycles are the sulfur-iodine cycle where X is I, the sulfur-bromine cycle where X is Br. Usually step 3 is driven electrochemically. The hybrid electrochemical sulfur cycle is based on only two reactions:

$$2H_2O + SO_2 \rightarrow H_2 + H_2SO_4 \quad (6)$$

$$H_2SO_4 \rightarrow H_2O + SO_2 + \tfrac{1}{2}O_2 \quad (7)$$

Reaction (6) is driven electrochemically. This thermochemical reaction cycle is illustrated in FIG. 1. The system generally includes a thermal source 10, such as a very high temperature nuclear reactor (VHTR) and/or a solar concentrator, an oxygen splitting decomposition reactor 12, an electrochemical hydrogen reactor 14, a sulfuric acid preheater 16, and a decomposition gas heat exchanger 18 and separator 20.

The decomposition reactor 12 is contained in a first loop in which a primary heat exchange liquid (I) such as a liquid metal, molten salt or an inert gas such as helium, is heated to decomposition temperature of sulfuric acid, generally about 830° C. to 850° C. in thermal source 10 and is fed to the enclosed heating means 10 such as a coil 21 in decomposition reactor 12 and then to steam generator 22 which drives turbine-generator 24 before being recycled through line 26 to the thermal source 10.

The sulfuric acid fed from recycle line 30 into the reactor 12 is decomposed into $SO_2$, $O_2$ and $H_2O$ gases at a temperature of about 830° C. The decomposition gases in outlet line 32 are fed serially through the tube bank 34 in heat exchanger 18, the annular heating shell 36 in electrochemical reactor 14 and the through line 38 into separator 20 where the gases are separated into an outlet oxygen stream 42, a recycle water stream 44 and a recycle $SO_2$ stream 46.

The streams 44, 46 are recycled to the electrochemical reactor 14 containing electrodes 48 and a semipermeable membrane separator 40 where they are converted into hydrogen gas recovered at 50 and aqueous sulfuric acid which is fed through line 52 to the preheater 16.

The aqueous sulfuric acid is directly mixed with heat exchange liquid from line 54 such as a polyperfluoropropylene oxide liquid which has been preheated to a temperature of 300°–400° C. in preheater 16. The heat exchange liquid will rise to the top to form an immiscible phase from which the liquid is removed and recycled to the preheater through line 56. The sulfuric acid preheated to near its vaporization point is fed to the decomposition reactor through line 30.

Figure 2:
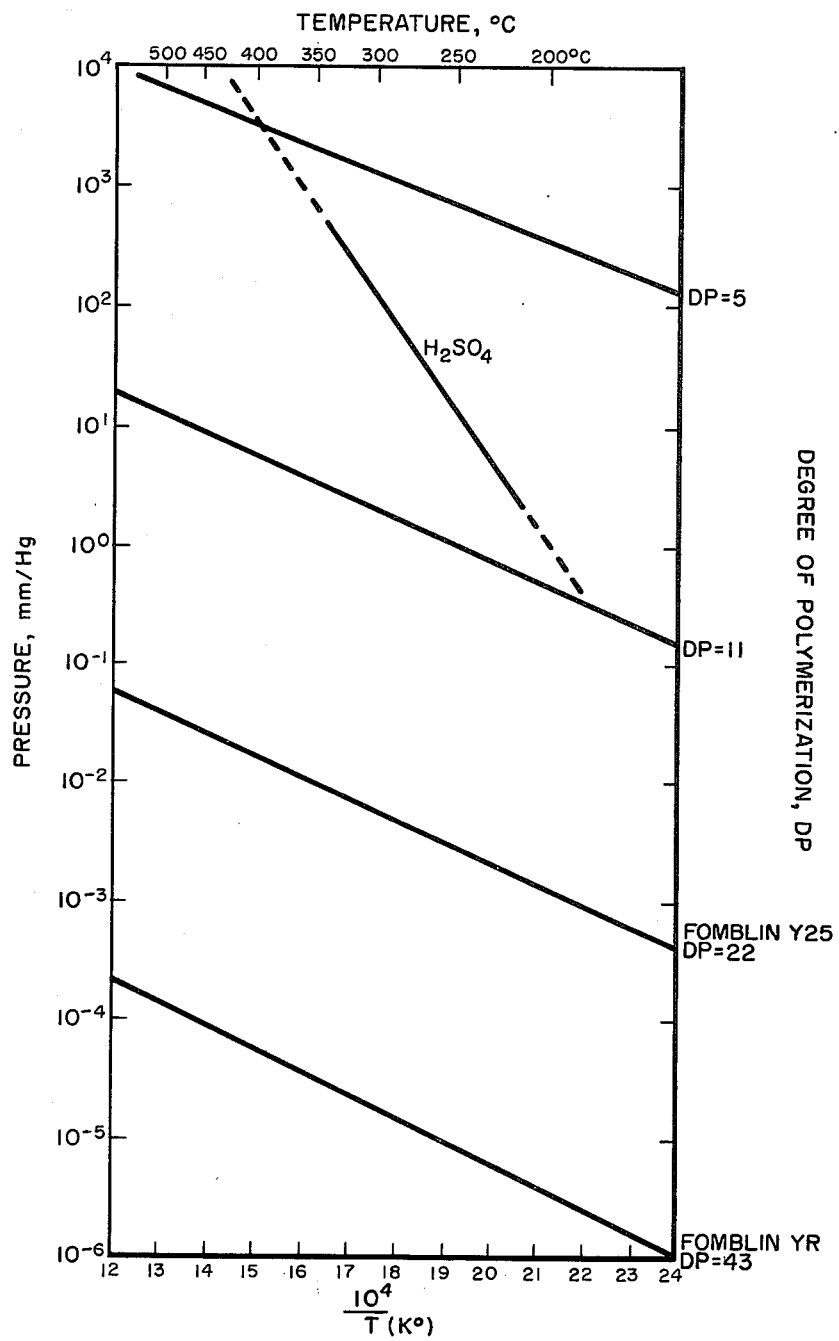
FIG. 2 is a series of vapor pressure curves for sulfuric acid and various polyperfluoropolypropylene oxide fluids.

Various perhalocarbons were tested for use as the direct fluid contact heat exchange fluid for use in the process of the invention. A brief summary of the known physical chemical properties are given in Table 1 and vapor pressure data are presented in FIG. 2.

TABLE 1
Summary of Chemical and Physical Properties of Candidate Heat Transfer Liquids

| Material Trade Name | Chemical Type | B.P. 760 mm | Vapor Pressure mm of Hg (at 25° C.) | Solubility Parameter (at 25° C.) | Source |
|---|---|---|---|---|---|
| Fluorolube 300/140 | A low mol. wt. Polymer of ClFC=CF₂ | Above decomp. temp. | Less than 1 mm | 7.2 | Hooker Chemical Corp. Niagara Falls, N.Y. |
| Medifluor FC-47 | Perfluorotributylamine | 183° C. at 760 mm | 2.5 mm | 5.9 | 3M Co. Medical Product Div. |
| Freon E-4 | Perfluoro (propylene oxide) polymer | 193° C. | ~1 mm at | 5.5 | DuPont Freon Products Division |
| Flutec Liquid | Perfluorocyclic/hydrocarbon | 200° C. | Less than 1 mm | ~5.8 | ISC Chem. Ltd. Avonmouth, England |
| Fomblin L MW - 1800 | Perfluoro (propylene oxide) polymer | 170–410° C. at 3mm | ≃3.5 mm | ~5.8 | Montecatini-Edison Italy |
| Fomblin U | Perfluoro (propylene oxide) polymer | Above decomp. temp. | ~0.60 mm | ~5.8 | Montecatini-Edison Italy |

All the thermal testing (except for several early runs) was done in fused quartz vessels because of the attack of concentrated sulfuric acid at high temperatures on Pyrex glass, and lack of thermal stress in quartz. Two types of thermal testing were conducted:

1. Refluxing sulfuric acid and the liquid was carried out in a quartz cylinder about 6 cm in diameter and about 20 cm in height, closed with a 100 ml Pyrex beaker. Any evolution of hydrogen fluoride was detected by etching of the beaker.

2. One material, Fomblin U, was tested in a sealed tube. To a quartz tube of 1.25 cm I.D. (2 mm thick walls) and 15 cm length was added 0.4 ml of Fomblin U and 0.4 ml of concentrated $H_2SO_4$. The tube was then sealed and heated in a muffle furnace for 6 hours at 370° to 400° C.

Only Fomblin U was tested in this manner because of concern the tube might break due to high vapor pressure of the compound or decomposition products. Table 2 gives a summary of the test results.

TABLE 2

Characteristic Results of High Temperature Contact Between Concentrated $H_2SO_4$ and Selected Fluorocarbons*

| Fluorocarbon (Tradename) | Max Temp. attained (°C.) | Hours of high temp $H_2SO_4$ contact | Differences in IR Spectra before and after | Evidence of HF Evolution + | Comments, notes |
|---|---|---|---|---|---|
| 1. Fluorolube | 285–300 | 93 | Yes; CH and C=O stretches found | Yes | V. viscous at room temp. waxy after reflux |
| 2. Mediflour | 189 | 93 | No change | Yes | All distilled after 93 hrs. of reflux |
| 3. Freon E-4 | 200 | 90 | No change | No | All distilled after 90 hrs. |
| 4. Flutec PP7 | 190 | 240 | No change | No | All distilled after 240 hrs. |
| 5. Fomblin L | 310 | 96 | No change | Yes | |
| 6. Fomblin U | 317 | 96 | No change | Yes | |
| 7. Fomblin U | 400 | 6 | No change | Yes | Carried out in sealed quartz tube (see experimental section) |

+ Etching of pryrex covers or reflux column observed.
*All mixtures (1-6) contained equal aliquots (10-15 ml) of concentrated $H_2SO_4$ and the fluorocarbon. Mixtures 2-4 could not be pushed beyond these temperature plateaus. Temperature was measured by suspending a 360° C. thermometer into the fluid just above the bottom of the vessel.

The Fomblin liquids appear to be the most promising. Fomblin U was given the most rigorous treatment and infrared spectral analysis showed no detectable structural alterations, although evolution of hydrogen fluoride was detected.

In order to evaluate miscibility, Fomblin U tested in the refluxing quartz cylinder experiment was analyzed for sulfuric acid content by titration. It was found that the sample contained less than 0.1 mg acid per ml of Fomblin. The acid was most likely present as a suspension in the Fomblin, because when a drop of this material was placed on moistened pH paper, the acidity color change appeared as small isolated spots.

All infrared spectra were obtained with a Perkin-Elmer Infracord Model 137 using sodium chloride cells.

This study indicates that it is possible to have stable liquids in the temperature range at which concentrated sulfuric acid is a vapor. The only materials satisfying all the criteria for the direct contact heating of sulfuric acid to vaporization temperature are the perfluoropropylene oxide polymers with a degree of polymerization (DP) of ~10 to 60. It is desirable to have the DP in the high range, above 30 because the vapor pressure of the material will decrease as the DP is increased, resulting in higher operating temperatures (see FIG. 2).

Immiscibility is important, since it minimizes the transport of $H_2SO_4$ by the heat exchange fluid to the system heat source. Because the solubility parameters of these fluids are low, the solubility in acid should be very slight. (The solubility parameter of $H_2SO_4$ at 298K is 18.0).

The experiments showed very little acid was present in Fomblin U at room temperature, but there was concern that mutual solubility may increase at higher temperatures. Although the difference in solubility parameters is high and therefore immiscibility is expected, a more quantitative estimate of the degree of mutual solubility at the operating temperature can be obtained from the following approximate relationship.

$\frac{1}{2} (V1+V2) (\delta_1-\delta_2)^2 > 2$ RT when $V_1 \neq V_2$ which indicates that mutual solubility will be low if the expression on the left is greater than 2 RT. At T=603°, the boiling point of $H_2SO_4$, 2 RT is 2395, and $V_1$, $V_2$, $\delta_1$ and $\delta_2$ are approximately 50, 2550, 15.5 and 5.0, respectively, (where the subscript one refers to $H_2SO_4$ and two to Fomblin U). Using these values in the above relationships gives:

$$1.4 \times 10^5 > 2395$$

or a ratio of 58 to 1, which indicates that Fomblin U and sulfuric acid should be very immiscible at the operating temperature.

The possible problem areas of the fluorocarbon fluids are:

1. The commercial polymer liquid materials are not pure compounds and tend to evolve hydrogen fluoride during the first hour or so on contact with sulfuric acid at these temperatures. A pretreatment with sulfuric acid may eliminate this problem.

2. Highly fluorinated fluids may react violently with metals such as aluminum and magnesium and their alloys under conditions where fresh active metal surfaces are created. Therefore, the system should be designed to avoid this condition and to avoid corrosive contamination of sulfuric acid.

3. The perfluoroethers are decomposed by halogenated Lewis acids such as $AlCl_3$, $SbF_5$, but are stable to oxygen or ozone. Therefore, any use in other thermochemical cycles besides service with sulfuric acid should be evaluated with this in mind.

It is to be understood that only preferred embodiments of the invention have been described and that numerous substitutions, alterations and modifications are all permissible without departing from the spirit or scope of the invention as defined in the following claims.

We claim:

1. In a method of thermally decomposing sulfuric acid, by heating the sulfuric acid to a high thermal decomposition temperature of about 830° C., the improvement comprising:

preheating the sulfuric acid before decomposition to a temperature of from 300° C. to 400° C. by directly mixing the sulfuric acid with a perfluoro (propylene oxide) liquid polymer having a degree of polymerization from about 10 to 60, said polymer being chemically stable to concentrated sulfuric acid at said temperature, having low miscibility with sulfuric acid at said temperature and having a low vapor pressure at said temperature to form a mixture.

2. A method according to claim 1 further including the steps of separating the mixture into a layer of said liquid polymer and a layer of preheated sulfuric acid, removing the sulfuric acid layer and further heating the preheated sulfuric acid to above its decomposition temperature to generate decomposition gases comprising $SO_2$, $H_2O$ and $O_2$.

3. A method according to claim 2 further including the steps of heating said liquid polymer to a temperature from 300° C. to 400° C. by placing it in indirect heat exchange contact with said decomposition gases.

4. A method according to claim 3 further including the steps of separating oxygen from the decomposition gases and electrochemically reacting the remaining $SO_2$ and $H_2O$ to form hydrogen gas and sulfuric acid and recycling the sulfuric acid to said preheating step.

5. A method according to claim 2 in which the sulfuric acid is heated to decomposition temperature by heat supplied by heating a heat exchange fluid by means of a thermonuclear reactor and/or a solar concentrator heater.

6. A method according to claim 1 in which the vapor-pressure of said liquid polymer at 25° C. is less than about 0.1 mm mercury.

7. A method according to claim 1 in which the degree of polymerization is from about 30 to about 50.

8. A method according to claim 1 in which the amount of sulfuric acid in the mixture is from 10 to 60% by volume.

* * * * *